United States Patent [19]

Melnyk, Jr.

[11] Patent Number: 4,627,236
[45] Date of Patent: Dec. 9, 1986

[54] APPARATUS AND METHOD FOR CONTROLLING THE SPEED OF ROTATION OF SHAFT

[75] Inventor: Michael Melnyk, Jr., Chester, Va.

[73] Assignee: Reynolds Metals Company, Richmond, Va.

[21] Appl. No.: 614,842

[22] Filed: May 29, 1984

[51] Int. Cl.[4] .............................................. F16D 31/02
[52] U.S. Cl. ...................................................... 60/435
[58] Field of Search ...................... 60/435; 417/22, 24, 417/42, 223; 415/18, 30; 318/303, 139, 140, 146–149, 159

[56] References Cited

U.S. PATENT DOCUMENTS

| 1,926,995 | 9/1933 | Harkness ......................... 318/303 X |
| 2,281,954 | 5/1942 | Rinia ..................................... 318/303 |
| 2,331,218 | 10/1943 | Montelius . |
| 3,090,901 | 5/1963 | Shaw . |
| 3,241,948 | 3/1966 | Claiborne et al. . |
| 3,529,422 | 9/1970 | Herndon . |
| 3,572,959 | 3/1971 | Shaughnessy . |
| 3,613,367 | 10/1971 | Smith et al. . |
| 3,943,713 | 3/1976 | Walton . |
| 4,355,266 | 10/1982 | Pearson ........................... 318/303 X |
| 4,404,942 | 9/1983 | Asami . |

Primary Examiner—Edward K. Look
Attorney, Agent, or Firm—Alan M. Biddison

[57] ABSTRACT

An apparatus and method for controlling the speed of rotation of a shaft. A sensor senses the speed of rotation and generates a first signal representative of the sensed speed. A controller compares the first signal with a second signal representative of a predetermined speed and generates an error or control signal representative of the comparison. The control signal is fed to the field of an alternator in such manner that the field of the alternator increases as the sensed speed increases over the predetermined speed. The field of the alternator opposes rotation of the alternator shaft. The alternator shaft is operatively associated with the shaft whose speed is being controlled so that the increase in alternator field force results in the application of a braking force on the shaft to thereby reduce its speed of rotation to the desired speed. As the shaft's speed approaches the desired speed, the alternator field force is decreased so as to prevent reduction of the shaft's speed below the desired value.

3 Claims, 1 Drawing Figure

APPARATUS AND METHOD FOR CONTROLLING THE SPEED OF ROTATION OF SHAFT

BACKGROUND OF THE INVENTION

1. Field of the Invention

The present invention provides an apparatus and a method for controlling the speed of rotation of a shaft. More particularly, the invention uses an alternator to control the speed of rotation of a shaft driven by an air motor.

2. Description of the Prior Art

U.S. Pat. No. 3,241,948, entitled "Aluminus Metal Particles", the contents of which are herein incorporated by reference, describes an apparatus for forming aluminum particles from molten aluminum. The apparatus has a particle forming unit that includes a centrifugal casting pot mounted on a vertical shaft. The shaft is driven through a pulley and a belt by a motor. In a commercial embodiment, the motor was connected directly to the shaft. An electric motor was used to provide power because it was believed critical to maintain tight tolerance on the speed of rotation of the casting pot.

A problem was encountered with the previously known apparatus when there was a power failure. The rotation of the pot would stop and the molten metal would drip from the pot onto the motor and burn it out. This problem was solved by replacing the electric motor with an air motor. This solution, however, created another problem in that it was not possible to maintain control of the speed of rotation of the pot within desired limits when an air motor was used in place of the electric motor.

Systems are known for maintaining the speed of a driven shaft constant through use of a control which senses the difference between the actual speed of the shaft and a desired value. Such difference is used to generate an error signal that is used to adjust the mechanism driving the shaft so as to obtain the desired output speed. None of these systems, however, uses an alternator to control the speed of rotation of an air driven shaft.

U.S. Pat. No. 3,572,959, entitled "Coupling Controller", and U.S. Pat. No. 4,404,942, entitled "Method of Controlling the Rotational Speed of a Rotary Shaft", are representative of patents describing such systems.

SUMMARY OF THE INVENTION

The present invention provides an apparatus and method for controlling the speed of rotation of a shaft rotatably driven by an air motor.

One embodiment of the present invention is utilized to control the speed of rotation of a centrifugal casting pot used to form particles from molten aluminum. The pot is mounted on a vertical shaft that is driven by an air motor. As the shaft rotates, molten aluminum is poured into the pot and is spewed out through hundreds of tiny holes perforated in the pot. The molten particles solidify as they fly through the air and descend to the bottom of the pit. A system of this type is described in the aforementioned U.S. Pat. No. 3,241,948.

With the present invention, the speed of rotation of the pot is controlled within approximately one or two RPM of a desired value, such as 800 RPM or 1425 RPM. With the invention, the rotational speed of the air driven shaft is sensed and supplied to a control that compares the signal representative of the sensed speed with a signal representative of the desired speed. The result of the comparison is fed as a control signal to the field of an alternator. A shaft of the alternator is connected by a belt and a series of pulleys with the shaft rotating the pot. When the sensed rotational speed of the air driven shaft increases above the desired or predetermined value, the control signal fed to the field of the alternator is increased so that the alternator field exerts a greater force on its shaft. This greater force opposes rotation of the alternator shaft by the belt. In turn, the belt exerts a braking force on the air driven shaft rotating the centrifugal pot. As the speed of rotation of the pot shaft decreases, the strength of the alternator field also decreases. As a result, the braking force applied to the pot shaft decreases. In this manner, it is possible to maintain the speed of the rotation of the air driven shaft within one or two RPMs of a desired predetermined value.

One embodiment of the invention provides an improved speed control means for maintaining the speed of rotation of the driving end portion of shaft means at a predetermined speed. The driven end portion of the shaft means is driven at a speed not less than the predetermined speed. The improved speed control means includes sensing means for sensing and for generating a first signal representative of the sensed speed of rotation of the shaft means. The first signal is compared with a second signal representative of the predetermined speed and an error or control signal is generated representative of the comparison. The magnitude of the control signal increases with increases of the sensed speed above desired speed. The control signal, after being amplified, is fed to the field of an alternator that operates as electrically actuated brake means. As the control signal increases, the field of the alternator correspondingly increases so that an increasingly larger force opposes rotation of the shaft of the alternator. The alternator shaft is operatively associated with the shaft driving the centrifugal pot by a belt and a series of pulleys. As the field of the alternator increases, a correspondingly larger braking force is applied by the belt to the shaft rotating the pot. In this manner the speed of rotation of the pot is controlled.

The invention also provides a method for controlling the speed of rotation of a shaft. The method includes sensing the speed of rotation of a driven end portion of the shaft and generating a signal representative of the sensed speed. This signal is compared with a second signal representative of a desired predetermined speed and an error or control signal is generated representative of the comparison. The control signal is fed to the field of an alternator. As the sensed speed increases over the desired speed, the field strength also increases. The alternator has a shaft operatively associated with the shaft rotating the pot. As the alternator field force increases, an increasing braking force is applied to both the alternator shaft and the shaft whose speed is being controlled so that its speed of rotation is controlled at the desired speed.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawing which depicts schematically one embodiment of the present invention.

DESCRIPTION OF THE PREFERRED EMBODIMENTS

Figure 1:
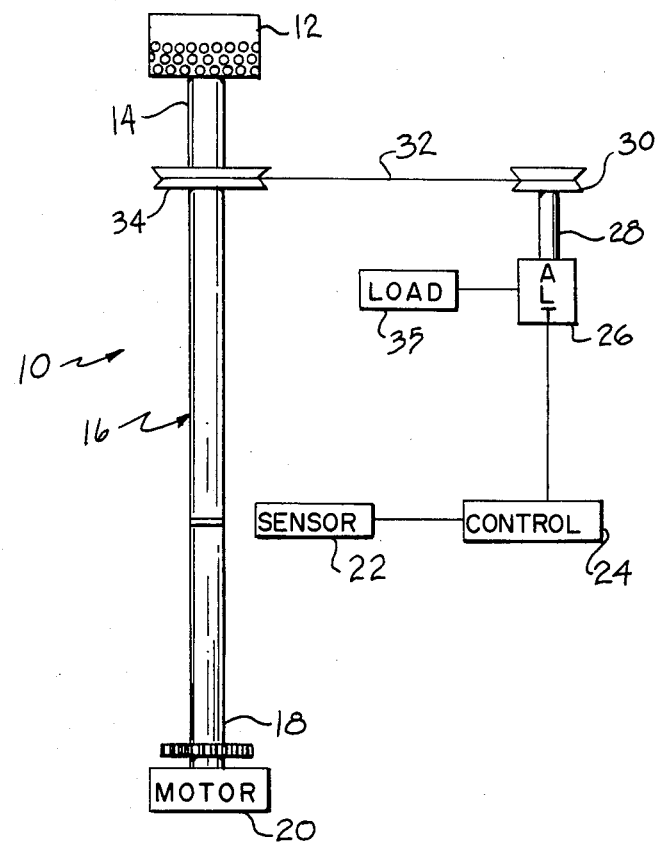

The present description will be directed in particular to elements forming part of, or cooperating more directly with, the present invention. Elements not specifically shown or described herein are understood to be selectable from those known in the art.

Referring now to the drawing, one embodiment of the present invention is illustrated and will be described in connection with an apparatus for forming aluminus metal particles, generally designated 10. The apparatus 10 includes a centrifugal casting pot 12 of the type described in U.S. Pat. No. 3,241,948. The shaft 12 is rotatably driven by the driving end portion 14 of a shaft generally designated 16. The shaft 16 has a driven end portion 18 positioned so as to be rotatably driven by an air motor 20.

Use of an air motor instead of an electrical motor in this environment is advantageous when there is a loss of power. There is sufficient air pressure accumulated within the system driving the air motor 20 to allow a gradual shutdown of the flow of metal to the pot 12 so that there will be minimum damage to the components of the apparatus 10.

A sensor 22 senses the speed of rotation of the shaft 16 and generates a first signal representative of the sensed speed. An example of a suitable sensor is described in U.S. Pat. No. 3,572,959, the contents of which are herein incorporated by reference.

The signal generated by the sensor 22 is furnished to a control 24. Control 24 includes a timer/oscillator for generating a second signal representative of a desired predetermined speed. Preferably, the oscillator is adjustable to provide one of several predetermined speeds, such as 800 RPM or 1425 RPM. A comparator within the control 24 compares the first signal generated by the sensor 22 with the second signal generated by the oscillator and generates an error or control signal representative of the comparison. This signal is preferably inverted and amplified and fed to the field of an alternator 26.

Alternator 26 has a shaft 28 supporting a pulley 30. A belt 32, which may be a V-belt or a toothed belt, connects the pulley 30 with a pulley 34 carried by the shaft 16. The output of the alternator is furnished a load 35, such as one or more resistors.

Preferably, a speed reduction is provided between the alternator shaft 28 and the air driven shaft 16. The amount of reduction provided is a compromise between the optimum operating speed of the alternator and the desired speed of rotation of the pot 12. For instance, one embodiment of the invention utilizes a gear ratio of 2:1, but a ratio as high as 10:1 could be provided.

One embodiment of the present invention utilizes a tape recorder speed control circuit manufactured by Revox Corporation that includes an ECG 955M timer/oscillator and an ECG 725 dual low-noise operational amplifier. Information on ECG semiconductors can be obtained from Phillips ECG Inc., P.O. Box 3277, Williamsport, Pa. 17701. The alternator in this embodiment was designed for use in a Chevrolet automobile.

Considering now the operation of one embodiment of the present invention, the apparatus 10 is energized and air under pressure is furnished to the motor 20. Shaft 16 commences rotation. Initially, sensor 22 senses that the speed of rotation of the shaft is less than the predetermined value. The control signal furnished by control 24 to the field of alternator 26 will be such that the field exerts substantially no force opposing rotation of the alternator shaft 28. As long as the speed of rotation of shaft 16 is less than the predetermined value, such as 800 RPM, the field of the alternator 26 will exert no force on the shaft 28.

When the sensed rotational speed exceeds that of the predetermined value, control 24 supplies a control signal to the field of alternator 26. Such control signal results in generation of a field force that opposes rotation of the alternator shaft 28. Since the shaft 28 is operatively associated with the shaft 16 by the belt 32, the increased field force results in the application of a braking force on both shaft 28 and the shaft 16. This braking force tends to reduce the rotational speed of the shaft 16 to the predetermined speed. As the rotational speed of shaft 16 approaches the predetermined speed, the magnitude of the error or control signal diminishes so that the alternator field force decreases correspondingly. As a result, a smaller braking force is applied to the shaft 16 to enable it to maintain the predetermined speed.

Molten aluminum metal is then introduced into the pot 12 which provides an increased load on the shaft 16. The increase in the load on the shaft 16 is matched almost instantaneously by a decrease in the field force of the alternator 26. As a result, the speed of rotation of the shaft 16 remains substantially constant.

In summary, the present invention provides an improved apparatus and method for controlling the speed of rotation of a shaft. The shaft has an end portion 18 driven by an air motor 20. A suitable tachometer or sensor 22 senses the speed of rotation of the shaft and generates a signal representative of the sensed speed. The signal is fed to a control circuit 24 that compares the sensed signal with a signal representative of a desired predetermined speed and generates an error or control signal representative of the difference between the two signals. The control signal, after being amplified, is fed to the field of an alternator. The field of the alternator exerts a drag on a shaft 28 that, via means for operatively associating shafts 16 and 28, such as belt 32, exerts a braking force on shaft 16. In this manner, speed control is provided within ± one or two RPM of a desired set value.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. In an apparatus having shaft means with a driven end portion rotatably driven by an air motor and a driving end portion rotating a centrifugal molten metal casting pot, the improvement comprising speed control means for maintaining the speed of rotation of the driving end portion of the shaft means at a predetermined speed, the driven end portion of the shaft means being at a driven speed greater than the predetermined speed, said speed control means comprising:

sensing means for sensing and for generating a first signal representative of the sensed speed of rotation of the shaft means;

means for comparing said first signal with a second signal representative of the predetermined speed and for generating a control signal representative of the comparison; and electrically actuated brake means responsive to said control signal for applying a braking force to the shaft means when power is supplied to said apparatus and for applying no braking force when power is not furnished said apparatus to thereby allow rotation of said shaft means at the driven speed, the braking force being proportional to said control signal so that the braking force maintains the speed of rotation of the driving end portion of the shaft means at the predetermined speed, said brake means comprising an alternator having a shaft, and belt means for operatively associating said alternator shaft with the driving end portion of the shaft means, said control signal being fed to the field of said alternator so that the force opposing rotation of said alternator shaft is representative of the magnitude of the control signal, changes in the strength of the field exerting a varying braking force on said alternator shaft and on said belt means which is transmitted to the driving end portion of the shaft means to thereby maintain the speed of rotation of the driving end portion of the shaft means at the predetermined speed.

2. A drive system for rotating a centrifugal casting pot at a predetermined speed comprising:

an air motor;

shaft means having a driven end portion and a driving end portion, said driven end portion being positioned so as to be driven by said air motor, said air motor in the absence of a braking force being operable to rotate said driven end portion at a driven speed greater than the predetermined speed, said driving end portion of said shaft means being operatively associated with a centrifugal casting pot;

sensing means for sensing and for generating a first signal representative of the sensed speed of rotatioin of said shaft means;

comparing means for comparing the first signal with a second signal representative of the predetermined speed and for generating a control signal representative of the comparison;

brake means responsive to said control signal for applying a braking force to the shaft means when power is supplied to said drive system, said brake means upon loss of power exerting no braking force so that said driven end portion is rotatable at the driven speed, said brake means comprising:

(a) an alternator having a shaft, (b) means for operatively associating said alternator shaft with said shaft means, said alternator having a field receiving said control signal so that the field force opposing rotation of said alternator shaft changes with changes in the magnitude of the control signal, the field force increasing with increases in the magnitude of the control signal to thereby exert a larger force opposing rotation of said alternator shaft and corresponding movement of said means for operatively associating whereby said means for operatively associating applies a larger braking force on said shaft means to reduce its speed of rotation to the predetermined speed.

3. A method of controlling the speed of rotation of shaft means having a driven end portion and a driving end portion, the driven end portion being driven by an air motor at a driven speed greater than a predetermined speed, said method comprising:

sensing the speed of rotation of the driven end portion of the shaft means and generating a first signal representative of the sensed speed;

generating a second signal representative of a predetermined speed;

comparing the first and the second signals and generating a control signal representative of the comparison;

applying the control signal to the field of an alternator so that the field force opposing rotation of a shaft of the alternator varies with changes in the magnitude of the control signal; and interconnecting the shaft of the alternator with the driving end portion of the shaft means so that the alternator shaft is driven by the driving end portion of the shaft means, rotation of the alternator shaft being opposed by the field force of the alternator to thereby apply a braking force to the driving end portion that controls its speed of rotation, said alternator in the absence of power applying no braking force so that the shaft means is rotatable at the driven speed.

* * * * *